United States Patent
Huang

(10) Patent No.: US 10,511,830 B2
(45) Date of Patent: Dec. 17, 2019

(54) MULTI-VIEW DISPLAY

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 247 days.

(21) Appl. No.: 15/377,964

(22) Filed: Dec. 13, 2016

(65) Prior Publication Data

US 2018/0098054 A1    Apr. 5, 2018

(30) Foreign Application Priority Data

Sep. 30, 2016 (TW) ............... 105131538 A

(51) Int. Cl.
*H04N 13/305* (2018.01)
*H04N 13/122* (2018.01)

(52) U.S. Cl.
CPC ......... *H04N 13/305* (2018.05); *H04N 13/122* (2018.05)

(58) Field of Classification Search
None
See application file for complete search history.

(56) References Cited

U.S. PATENT DOCUMENTS

| | | | |
|---|---|---|---|
| 6,064,424 A | 5/2000 | van Berkel et al. | |
| 8,427,527 B2 | 4/2013 | Visser et al. | |
| 2009/0046142 A1 | 2/2009 | Cha et al. | |
| 2009/0315883 A1 | 12/2009 | King | |
| 2014/0029094 A1* | 1/2014 | Kroon | G09G 3/3208 359/463 |
| 2017/0195657 A1* | 7/2017 | Li | H04N 13/307 |

FOREIGN PATENT DOCUMENTS

| | | | |
|---|---|---|---|
| CN | 103792725 A | 5/2014 | |
| CN | 105425407 A | 3/2016 | |
| EP | 2337014 A1 | 6/2011 | |
| TW | 201240441 A | 10/2012 | |
| TW | 201310123 A | 3/2013 | |
| TW | 201504684 A | 2/2015 | |
| TW | I514005 B | 12/2015 | |

* cited by examiner

*Primary Examiner* — James M Anderson, II
(74) *Attorney, Agent, or Firm* — CKC & Partners Co., LLC

(57) ABSTRACT

A multi-view display includes a display panel and a lenticular lens. The multi-view display has a first direction. The display panel includes a plurality of pixels, and each of the pixels includes a plurality of sub-pixels sequentially disposed side by side along the first direction. The lenticular lens is disposed on the display panel, and the lenticular lens includes a plurality of cylindrical lenses. A difference between a number of the sub-pixels corresponding to each of the cylindrical lenses along the first direction and a number of the sub-pixels of each of the pixels is an odd number.

9 Claims, 4 Drawing Sheets

MULTI-VIEW DISPLAY

RELATED APPLICATIONS

This application claims priority to Taiwanese Application Serial Number 105131538, filed Sep. 30, 2016, which are herein incorporated by reference.

BACKGROUND

Technical Field

The present disclosure relates to a multi-view display.

Description of Related Art

In the human body, the positions of the left eye and the right eye are different, and the observed images of the left eye and the right eye may have slight differences, this is the fundamental cause of stereopsis. Stereo display devices use the vision characteristics of the eyes to generate stereopsis.

The conventional method to generate stereopsis in technology uses a spatial-multiplex method, that is, pixels on the screen are divided into different groups by dispersing of the lens to form a plurality of views when light emitted from the pixels converges on a viewing distance. The two eyes of a human observer will observe images in different views, and this will result in the generation of stereopsis.

To further improve the stereo display device, persons in the industry have made every endeavor to discover new solutions. The application and improvement of the stereo display device has become one of the most important research topics.

SUMMARY

This disclosure provides a multi-view display to enhance the stereopsis effect.

In one aspect of the disclosure, a multi-view display is provided. The multi-view display includes a display panel and a lenticular lens. The multi-view display has a first direction. The display panel includes a plurality of pixels, and each of the pixels includes a plurality of sub-pixels sequentially disposed side by side along the first direction. The lenticular lens is disposed on the display panel, and the lenticular lens includes a plurality of cylindrical lenses disposed side by side along the first direction. A difference between a number of the sub-pixels corresponding to each of the cylindrical lenses along the first direction and a number of the sub-pixels of each of the pixels is an odd number.

In one or more embodiments, the pixels are staggered with each other.

In one or more embodiments, each of the cylindrical lenses corresponds to an odd number of the sub-pixels along the first direction.

In one or more embodiments, each of the pixels includes four sub-pixels sequentially disposed side by side along the first direction, and the sub-pixels are sequentially a first sub-pixel, a second sub-pixel, a third sub-pixel, and a fourth sub-pixel.

In one or more embodiments, the first sub-pixel is a red sub-pixel, the second sub-pixel is a green sub-pixel, the third sub-pixel is a blue sub-pixel, and the fourth sub-pixel is a white sub-pixel.

In one or more embodiments, each of the cylindrical lenses corresponds to three or five sub-pixels along the first direction.

In one or more embodiments, the first sub-pixel is a red sub-pixel, the second sub-pixel is a blue sub-pixel, the third sub-pixel is a green sub-pixel, and the fourth sub-pixel is a white sub-pixel.

In one or more embodiments, each of the cylindrical lenses corresponds to three or five sub-pixels along the first direction.

In one or more embodiments, the first sub-pixel is a red sub-pixel, the second sub-pixel is a blue sub-pixel, the third sub-pixel is a green sub-pixel, and the fourth sub-pixel is a green sub-pixel.

In one or more embodiments, each of the cylindrical lenses corresponds to three or five sub-pixels along the first direction.

In one or more embodiments, the first sub-pixels are uniformly distributed, the second sub-pixels are uniformly distributed, the third sub-pixels are uniformly distributed, and the fourth sub-pixels are uniformly distributed.

In one or more embodiments, the multi-view display further has a second direction perpendicular to the first direction, the first sub-pixels and the third sub-pixels are staggered with each other along the second direction, and the second sub-pixels and the fourth sub-pixels are staggered with each other along the second direction.

In one or more embodiments, the sub-pixels have a first width, the cylindrical lenses have a second width, the second width is greater than the first width, and the second width is an odd multiple of the first width.

In one or more embodiments, the display panel is a pentile display panel.

In one or more embodiments, a difference between a number of the sub-pixels covered by each of the cylindrical lenses along the first direction and a number of the sub-pixels of each of the pixels is an odd number.

Because each of the cylindrical lenses covers an odd number of the sub-pixels along the first direction, and the number of sub-pixels of each of the pixels are four, the first sub-pixels, the second sub-pixels, the third sub-pixels, and the fourth sub-pixels will be directed to different views by the lenticular lens, such that stereopsis is generated.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
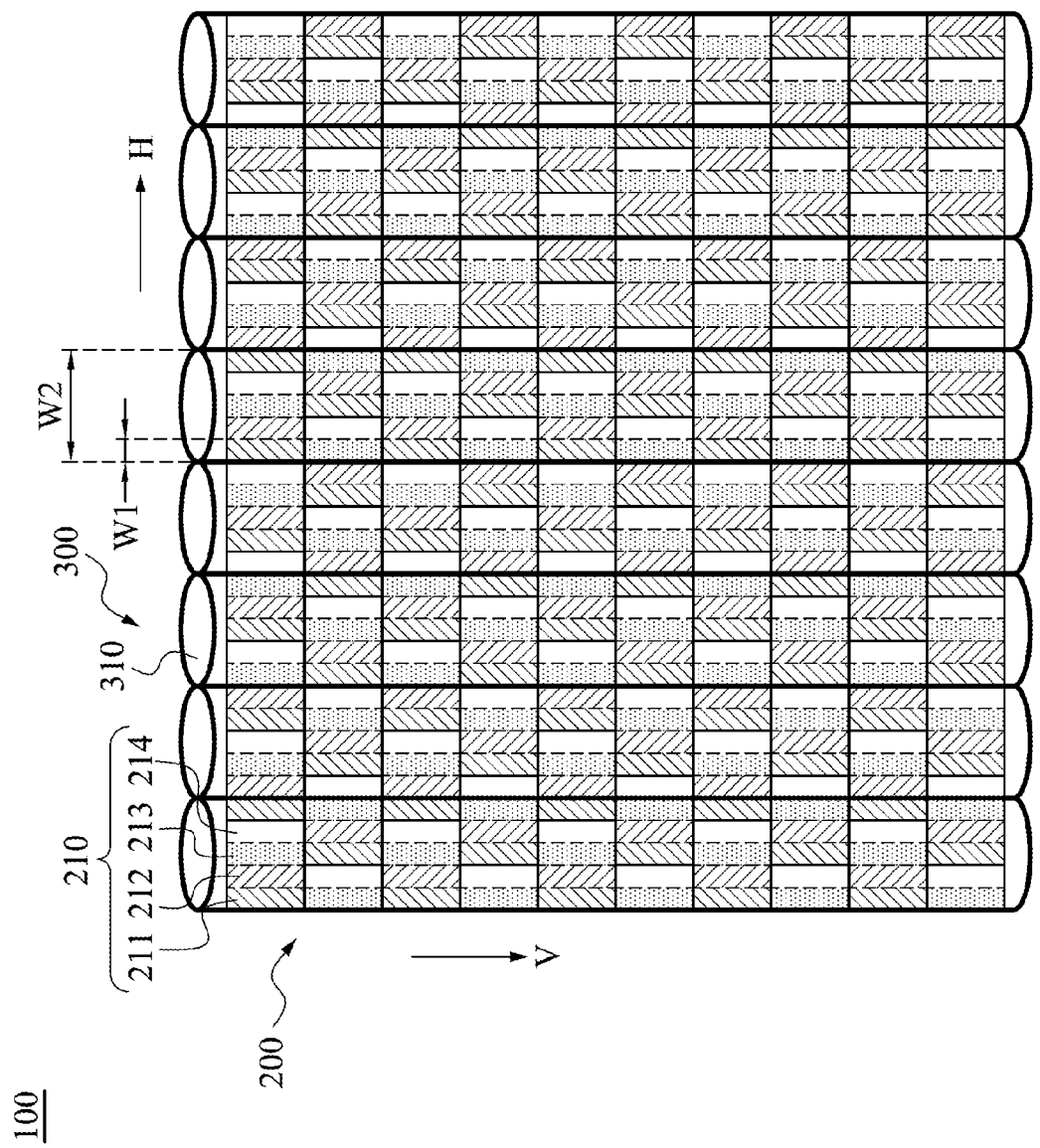
FIG. 1 is a schematic top view of a multi-view display according to one embodiment of this disclosure.

FIG. 1 is a schematic top view of a multi-view display 100 according to one embodiment of this disclosure. A multi-view display 100 is provided. Specifically, the multi-view display 100 may be a multi-view display using a pentile display panel.

As shown in FIG. 1, the multi-view display 100 has a first direction H and a second direction V perpendicular to the first direction H. The multi-view display 100 includes a display panel 200 and a lenticular lens 300. Specifically, the display panel 200 is a pentile display panel. The display panel 200 includes a plurality of pixels 210, and the pixels 210 are staggered with each other. Each of the pixels 210 includes four sub-pixels sequentially disposed side by side along the first direction H, and the sub-pixels are sequentially a first sub-pixel 211, a second sub-pixel 212, a third sub-pixel 213, and a fourth sub-pixel 214. The lenticular lens 300 is disposed on the display panel 200, and the lenticular lens 300 includes a plurality of cylindrical lenses 310 disposed side by side along the first direction H. Each of the cylindrical lenses 310 corresponds to an odd number of the sub-pixels along the first direction H.

Specifically, in this embodiment, each of the cylindrical lenses 310 covers five sub-pixels along the first direction H. Because each of the pixels 210 includes four sub-pixels sequentially disposed side by side along the first direction H, each of the cylindrical lenses 310 covers a pixel 210 (four sub-pixels) and an additional sub-pixel. Therefore, for one row of the sub-pixels along the first direction H, when the leftmost part of one of the cylindrical lenses 310 covers the first sub-pixel 211, the leftmost part of one of the cylindrical lenses 310 adjacent to the right side of the aforementioned cylindrical lens 310 covers the second sub-pixel 212. Then, the first sub-pixels 211, the second sub-pixels 212, the third sub-pixels 213, and the fourth sub-pixels 214 will be covered by the leftmost parts of different cylindrical lenses 310. In other words, light emitted by the first sub-pixels 211, the second sub-pixels 212, the third sub-pixels 213, and the fourth sub-pixels 214 will be directed to the same view by the leftmost parts of different cylindrical lenses 310.

Because each of the cylindrical lenses 310 covers five sub-pixels along the first direction H, light emitted by sub-pixels will be directed to five different views. Then, because the number of the sub-pixels covered by each of the cylindrical lenses 310 along the first direction H (five) is different from the number of the sub-pixels of each of the pixels 210 (four), the first sub-pixels 211, the second sub-pixels 212, the third sub-pixels 213, the third sub-pixels 213, and the fourth sub-pixels 214 will be directed to different views by different parts of each of the cylindrical lenses 310.

It is noted that the difference between the number of the sub-pixels covered by (corresponding to) each of the cylindrical lenses 310 along the first direction H and the number of the sub-pixels of each of the pixels 210 is an odd number, so the first sub-pixels 211, the second sub-pixels 212, the third sub-pixels 213, and the fourth sub-pixels 214 will be directed to all views. If the difference between the number of the sub-pixels covered by each of the cylindrical lenses 310 along the first direction H and the number of the sub-pixels of each of the pixels 210 is an even number, it is possible that only the first sub-pixels 211 and the third sub-pixels 213 are directed to one of the views, and only the second sub-pixels 212 and the fourth sub-pixels 214 are directed to one of the views.

Therefore, because each of the cylindrical lenses 310 covers an odd number of the sub-pixels along the first direction H, and the number of sub-pixels of each of the pixels 210 are four, the first sub-pixels 211, the second sub-pixels 212, the third sub-pixels 213, and the fourth sub-pixels 214 will be directed to different views by the lenticular lens 300, such that stereopsis is generated.

Specifically, the sub-pixels have a first width W1, the cylindrical lenses 310 have a second width W2, the second width W2 is greater than the first width W1, and the second width W2 is an odd multiple of the first width W1. In this embodiment, the second width W2 is five times the first width W1. Embodiments of this disclosure are not limited thereto. The person having ordinary skill in the art can make proper modifications to the sub-pixels and the cylindrical lenses 310 depending on the actual application.

It is noted that the pixels 210 are staggered with each other. Therefore, the first sub-pixels 211 are uniformly distributed, the second sub-pixels 212 are uniformly distributed, the third sub-pixels 213 are uniformly distributed, and the fourth sub-pixels 214 are uniformly distributed. On the other hand, because the pixels 210 are staggered with each other, the first sub-pixels 211 and the third sub-pixels 213 are staggered with each other along the second direction V, and the second sub-pixels 212 and the fourth sub-pixels 214 are staggered with each other along the second direction V.

Specifically, the first sub-pixels 211 are red sub-pixels, the second sub-pixels 212 are green sub-pixels, the third sub-pixels 213 are blue sub-pixels, and the fourth sub-pixels 214 are white sub-pixels. Because all the pixels 210 include white sub-pixels, and the white sub-pixels have a greater backlight efficiency compared to the red sub-pixels, the green sub-pixels, and the blue sub-pixels, overall the display panel 200 has a greater backlight efficiency and a greater brightness.

In addition, the first sub-pixels 211 are uniformly distributed, the second sub-pixels 212 are uniformly distributed, the third sub-pixels 213 are uniformly distributed, and the fourth sub-pixels 214 are uniformly distributed. Therefore, if the adjacent first sub-pixel 211, the second sub-pixel 212, and the third sub-pixel 213 are regarded as a white pixel, this kind of white pixels are uniformly distributed. Further, if this kind of white pixels and the fourth sub-pixels 214, which are white pixels, are regarded as independent pixels, these pixels are approximately uniformly distributed, and the resolution of these pixels are about two times that of the pixels 210. Therefore, the display panel 200 has an effective resolution that is two times that of the pixels 210.

Figure 2:
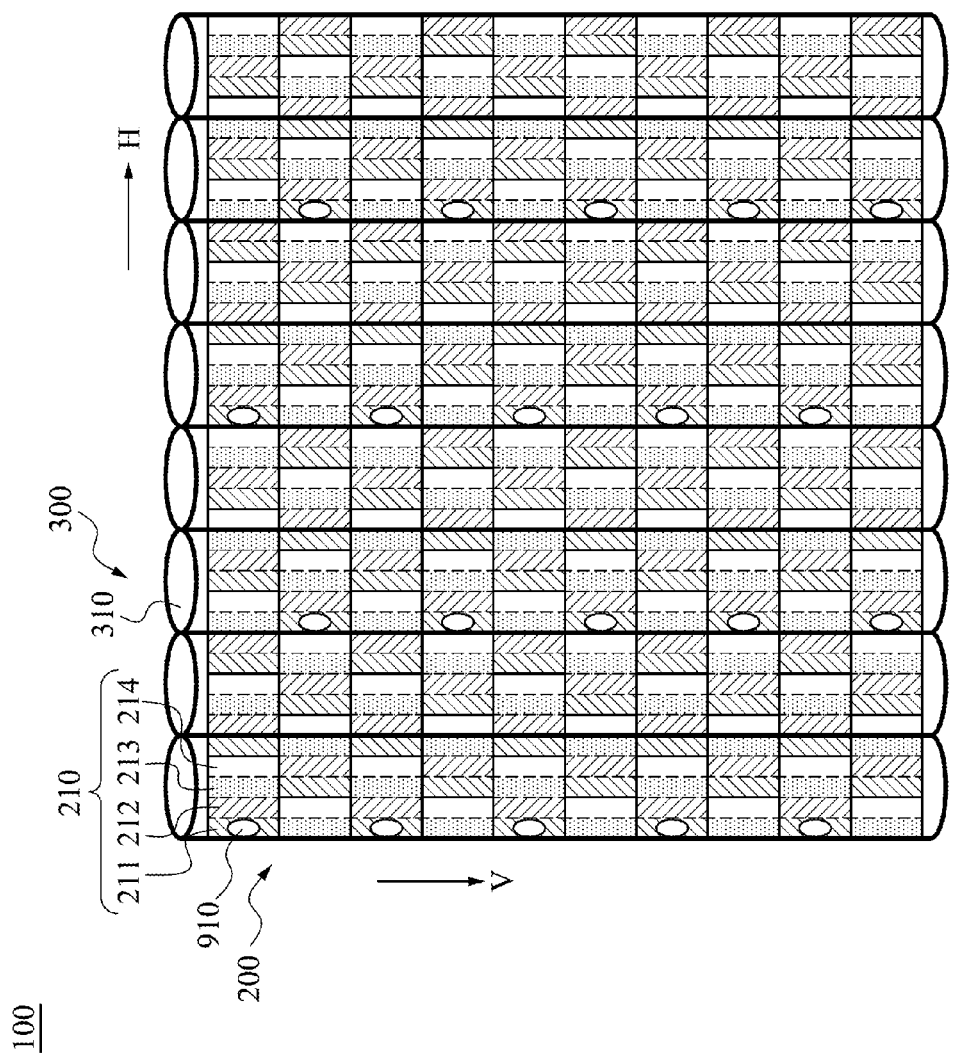
FIG. 2 is another schematic top view of the multi-view display according to one embodiment of this disclosure.

FIG. 2 is another schematic top view of the multi-view display 100 according to one embodiment of this disclosure. As shown in FIG. 2, marks 910 marks all the first sub-pixels 211 emitting light that are directed to one of the views by the lenticular lens 300. Compared the resolution of the first sub-pixels 211 in the display panel 200, the resolution of the first sub-pixels 211 along the first direction H decreases more than the resolution of the first sub-pixels 211 along the second direction V does in this view. The arrangement of the first sub-pixels 211 emitting light that are directed to the other of the views is similar to the aforementioned situation, and the arrangement of the other of the sub-pixels emitting light that are directed to different views is similar to the aforementioned situation. Therefore, the details are not repeated here.

Figure 3:
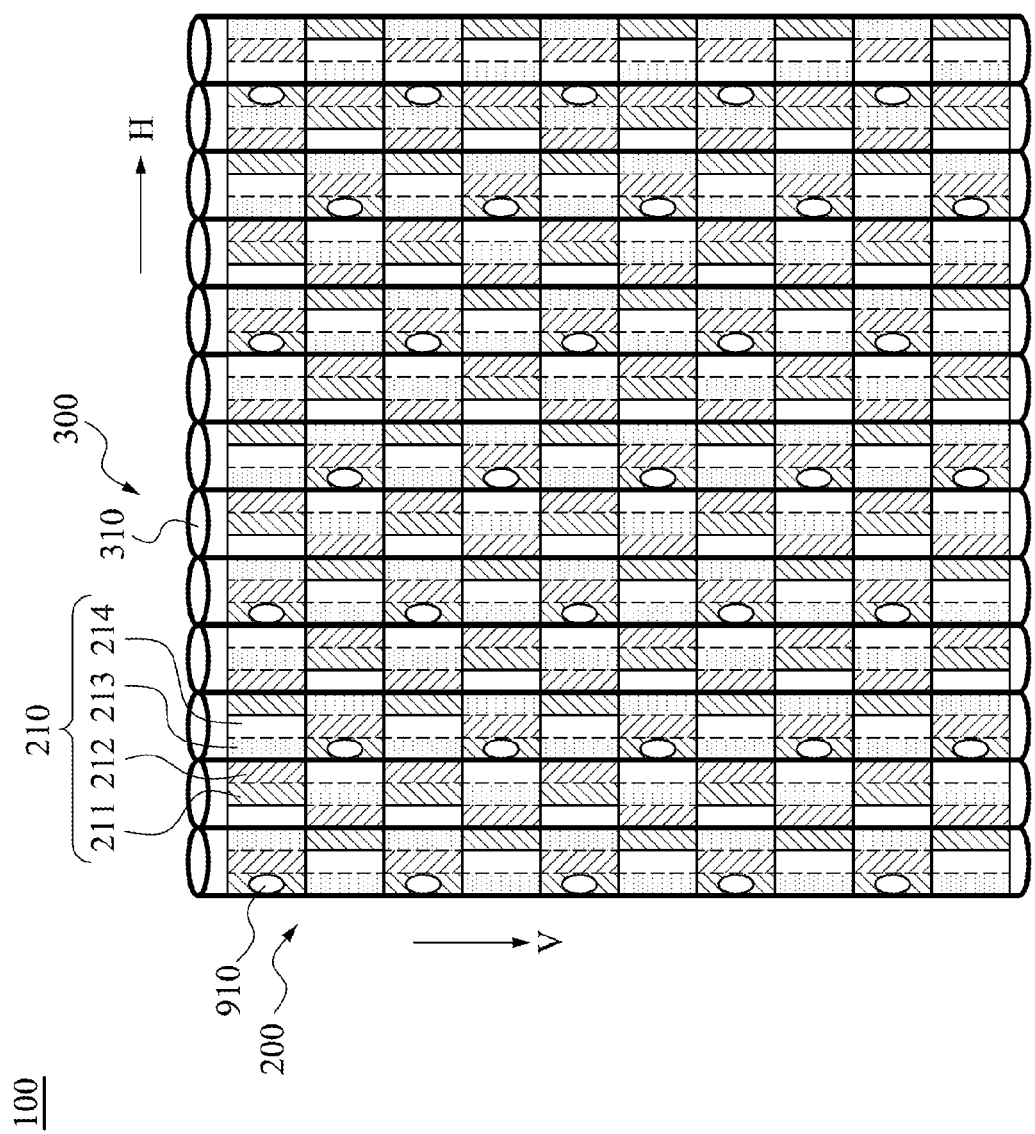
FIG. 3 is a schematic top view of the multi-view display according to another embodiment of this disclosure.

FIG. 3 is a schematic top view of the multi-view display 100 according to another embodiment of this disclosure. As shown in FIG. 3, the multi-view display 100 is similar to the multi-view display 100 in the aforementioned embodiment, and the main difference is that, in this embodiment, each of the cylindrical lenses 310 corresponds to three sub-pixels along the first direction H. In other words, each of the cylindrical lenses 310 covers three sub-pixels along the first direction H. In addition, as shown in FIG. 3, the marks 910 marks all the first sub-pixels 211 emitting light that are directed to one of the views by the lenticular lens 300. Similarly, compared the resolution of the first sub-pixels 211 in the display panel 200, the resolution of the first sub-pixels 211 along the first direction H decreases more than the resolution of the first sub-pixels 211 along the second direction V does in this view.

Further, as shown in FIG. 2 and FIG. 3, the more the sub-pixels each of the cylindrical lenses 310 corresponds to in the first direction H, the more the resolution of the first sub-pixels 211 along the first direction H decreases. Therefore, in order to avoid the situation that the resolution of the first sub-pixels 211 along the first direction H decreases too much, such that the display quality decreases, each of the cylindrical lenses 310 should not correspond to too much sub-pixels along the first direction H.

Specifically, when the first sub-pixels 211 are red sub-pixels, the second sub-pixels 212 are green sub-pixels, the third sub-pixels 213 are blue sub-pixels, and the fourth sub-pixels 214 are white sub-pixels, each of the cylindrical lenses 310 corresponds to three or five sub-pixels along the first direction H.

Figure 4:
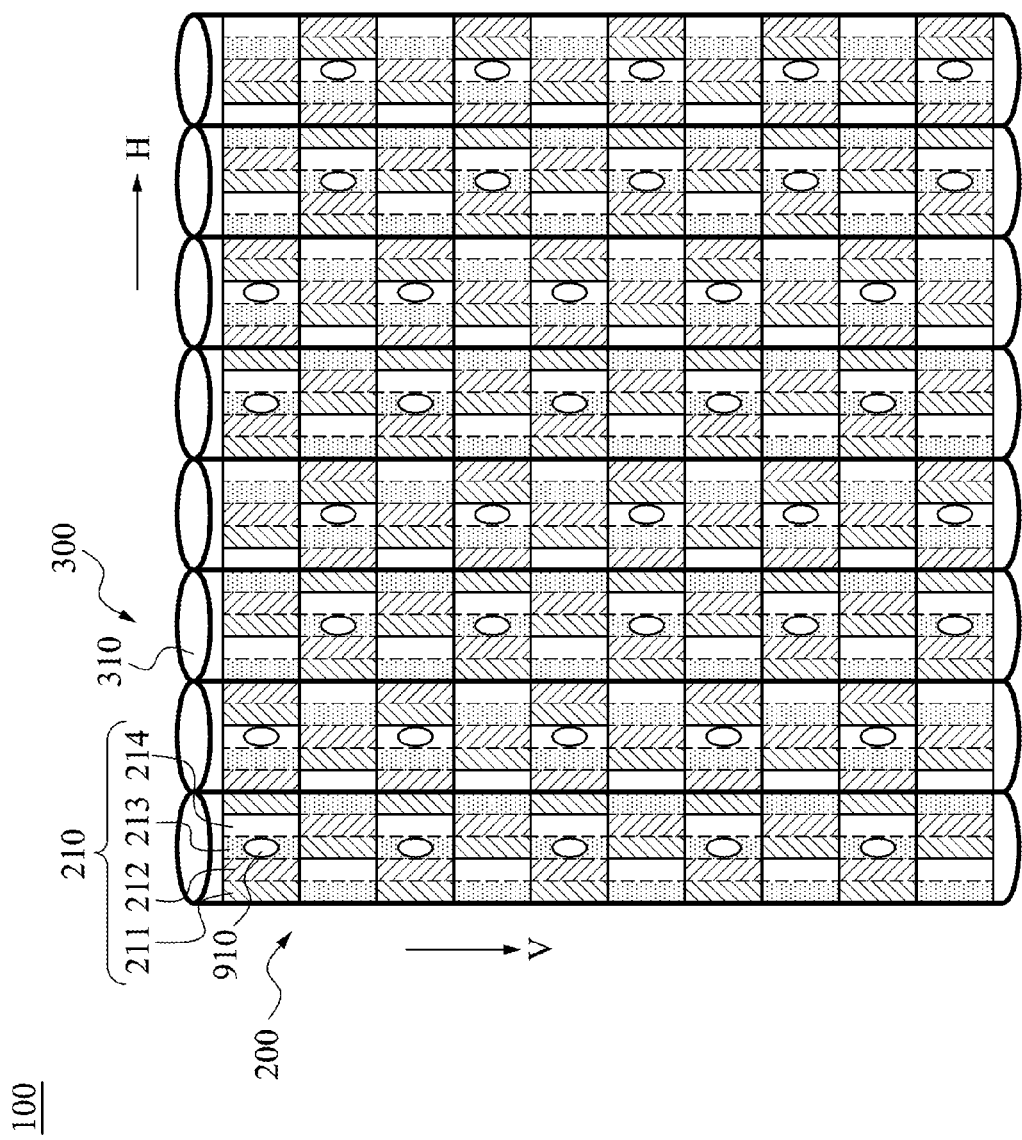
FIG. 4 is a schematic top view of the multi-view display according to another embodiment of this disclosure.

FIG. 4 is a schematic top view of the multi-view display 100 according to another embodiment of this disclosure. As shown in FIG. 4, the multi-view display 100 is similar to the multi-view display 100 in the aforementioned embodiment, and the main difference is that, in this embodiment, each of the cylindrical lenses 310 corresponds to five sub-pixels along the first direction H. The first sub-pixels 211 are red sub-pixels, the second sub-pixels are blue sub-pixels, the third sub-pixels 213 are green sub-pixels, and the fourth sub-pixels 214 are green sub-pixels. In addition, the marks 910 marks all the third sub-pixels 213 and the fourth sub-pixels 214 emitting light that are directed to one of the views by the lenticular lens 300. Because the third sub-pixels 213 and the fourth sub-pixels are all green sub-pixels, the human eyes cannot differentiate the two. Therefore, as shown in FIG. 4, compared the resolution of the third sub-pixels 213 or the resolution of the fourth sub-pixels 214 in the display panel 200, the decrease extent of the resolution of combination of the third sub-pixels 213 and the fourth sub-pixels 214 along the first direction H approximately equals the decrease extent of the resolution of combination of the third sub-pixels 213 and the fourth sub-pixels 214 along the second direction V in this view. Because the human eyes are most sensitive to green light, the human eye mainly perceives the arrangement of the combination of the third sub-pixels 213 and the fourth sub-pixels 214 without being aware of the arrangement of the first sub-pixels 211 and the arrangement of the second sub-pixels 212. Therefore, when the third sub-pixels 213 and the fourth sub-pixels 214 are all green sub-pixels, each of the cylindrical lenses 310 may correspond to three, five, or seven sub-pixels along the first direction H.

When the first sub-pixels 211 are red sub-pixels, the second sub-pixel 212 are blue sub-pixels, the third sub-pixel 213 are green sub-pixels, and the fourth sub-pixels 214 are white sub-pixels, the image positions of the white sub-pixels and the green sub-pixels are closer in each view. At the same time, because the human eyes are more sensitive to green light, the human eyes will not clearly distinguish the green sub-pixels and the white sub-pixels to certain extent. In other words, the situation perceived by the human eyes is approximately the same as that in the aforementioned embodiment (i.e., the fourth sub-pixels 214 are green sub-pixels). Therefore, each of the cylindrical lenses 310 may correspond to three, five, or seven sub-pixels along the first direction H.

Because each of the cylindrical lenses 310 covers an odd number of the sub-pixels along the first direction H, and the number of sub-pixels of each of the pixels 210 are four, the first sub-pixels 211, the second sub-pixels 212, the third sub-pixels 213, and the fourth sub-pixels 214 will be directed to different views by the lenticular lens 300, such that stereopsis is generated.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A multi-view display, wherein the multi-view display has a first direction, the multi-view display comprising:
    a display panel comprising a plurality of pixels, wherein the pixels comprise repeated groups of four sub-pixels sequentially disposed side by side along the first direction; and
    a lenticular lens disposed on the display panel, wherein the lenticular lens comprises a plurality of cylindrical lenses disposed side by side along the first direction, wherein each of the cylindrical lenses has a first width that is equal to a second width of each repeated group of four sub-pixels minus a third width of a single sub-pixel of each repeated group of four sub-pixels, wherein the first, second and third widths are measured along the first direction.

2. The multi-view display of claim 1, wherein the pixels are staggered with each other.

3. The multi-view display of claim 1, wherein each repeated group of four sub-pixels are sequentially a first sub-pixel, a second sub-pixel, a third sub-pixel, and a fourth sub-pixel.

4. The multi-view display of claim 3, wherein the first sub-pixel is a red sub-pixel, the second sub-pixel is a green sub-pixel, the third sub-pixel is a blue sub-pixel, and the fourth sub-pixel is a white sub-pixel.

5. The multi-view display of claim 3, wherein the first sub-pixel is a red sub-pixel, the second sub-pixel is a blue sub-pixel, the third sub-pixel is a green sub-pixel, and the fourth sub-pixel is a white sub-pixel.

6. The multi-view display of claim 3, wherein the first sub-pixel is a red sub-pixel, the second sub-pixel is a blue sub-pixel, the third sub-pixel is a green sub-pixel, and the fourth sub-pixel is a green sub-pixel.

7. The multi-view display of claim 3, wherein the first sub-pixels are uniformly distributed, the second sub-pixels are uniformly distributed, the third sub-pixels are uniformly distributed, and the fourth sub-pixels are uniformly distributed.

8. The multi-view display of claim 3, wherein the multi-view display further has a second direction perpendicular to the first direction, the first sub-pixels and the third sub-pixels are staggered with each other along the second direction, and the second sub-pixels and the fourth sub-pixels are staggered with each other along the second direction.

9. The multi-view display of claim 1, wherein the display panel is a pentile display panel.

* * * * *